US011933552B2

(12) United States Patent
Stephan et al.

(10) Patent No.: US 11,933,552 B2
(45) Date of Patent: Mar. 19, 2024

(54) HEAT EXCHANGER FOR HEATING GAS AND USE OF THE HEAT EXCHANGER

(71) Applicant: BASF SE, Ludwigshafen (DE)

(72) Inventors: Oskar Stephan, Ludwigshafen (DE); Karl-Friedrich Schneider, Altrip (DE); Matthias Weismantel, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 17/688,032

(22) Filed: Mar. 7, 2022

(65) Prior Publication Data

US 2022/0187034 A1 Jun. 16, 2022

Related U.S. Application Data

(63) Continuation of application No. 16/064,021, filed as application No. PCT/EP2016/082073 on Dec. 21, 2016, now abandoned.

(30) Foreign Application Priority Data

Dec. 23, 2015 (EP) .................................... 15202312

(51) Int. Cl.

| | |
|---|---|
| ***F28F 19/06*** | (2006.01) |
| ***C23C 2/06*** | (2006.01) |
| ***C23C 2/28*** | (2006.01) |
| ***F26B 3/04*** | (2006.01) |
| ***F26B 17/04*** | (2006.01) |
| ***F26B 21/02*** | (2006.01) |

(52) U.S. Cl.

CPC ................ *F28F 19/06* (2013.01); *C23C 2/06* (2013.01); *C23C 2/28* (2013.01); *F26B 3/04* (2013.01); *F26B 17/04* (2013.01); *F26B 21/02* (2013.01)

(58) Field of Classification Search

CPC ..... F28F 1/00; F28F 9/00; F28F 19/06; C23C 2/06; C23C 2/28; F26B 3/04; F26B 17/04; F26B 21/02

See application file for complete search history.

(56) References Cited

U.S. PATENT DOCUMENTS

| | | | | | |
|---|---|---|---|---|---|
| 4,891,275 | A | | 1/1990 | Knoll | |
| 4,971,842 | A | * | 11/1990 | Sippola | C23C 2/14 427/433 |
| 5,042,574 | A | | 8/1991 | Cottone et al. | |
| 6,177,140 | B1 | | 1/2001 | Patil et al. | |
| 6,276,872 | B1 | * | 8/2001 | Schmitt | F28D 15/00 405/129.28 |
| 10,208,170 | B2 | | 2/2019 | Daniel et al. | |
| 2002/0152630 | A1 | * | 10/2002 | Lindsay | D21F 5/004 34/111 |
| 2006/0235141 | A1 | * | 10/2006 | Riegel | C08G 65/3322 524/556 |
| 2008/0080300 | A1 | | 4/2008 | Stueven et al. | |
| 2010/0041549 | A1 | * | 2/2010 | Weismantel | C08F 220/06 502/402 |
| 2011/0059329 | A1 | * | 3/2011 | Dobrawa | A61L 15/60 428/522 |
| 2011/0204288 | A1 | * | 8/2011 | Funk | C08F 6/008 252/194 |
| 2011/0237767 | A1 | * | 9/2011 | Wengeler | C08F 6/005 526/318.42 |
| 2012/0048973 | A1 | * | 3/2012 | Stueven | C08J 3/12 526/317.1 |
| 2015/0105527 | A1 | | 4/2015 | Gartner et al. | |
| 2015/0299882 | A1 | * | 10/2015 | Buckalew | C25D 21/14 204/266 |
| 2016/0279605 | A1 | * | 9/2016 | Grünewald | B01J 20/30 |
| 2017/0037520 | A1 | * | 2/2017 | Schapiro | C23C 2/26 |
| 2019/0003789 | A1 | | 1/2019 | Stephan et al. | |

FOREIGN PATENT DOCUMENTS

| | | | | | |
|---|---|---|---|---|---|
| CN | 1125407 | A | | 6/1996 | |
| DE | 102008000237 | A1 | | 8/2008 | |
| DE | 102008033222 | A1 | | 1/2010 | |
| DE | 202015101101 | U1 | | 4/2015 | |
| EP | 3056846 | A1 | * | 8/2016 | F28C 1/14 |
| JP | S5016627 | A | | 2/1975 | |
| JP | 2012-528909 | A | | 11/2012 | |
| JP | 2013-522431 | A | | 6/2013 | |
| WO | WO-2006/034853 | A1 | | 4/2006 | |

OTHER PUBLICATIONS

International Search Report for International Application No. PCT/EP2016/082073, dated Mar. 24, 2017.

* cited by examiner

*Primary Examiner* — Gordon A Jones

(74) *Attorney, Agent, or Firm* — MARSHALL, GERSTEIN & BORUN LLP

(57) ABSTRACT

The invention relates to a heat exchanger for heating gas to a temperature in the range from 150 to 400° C., wherein the gas is heated by indirect heat transfer and all the surfaces of the walls of the heat exchanger which come into contact with the gas have been hot dip galvanized and the surfaces which come into contact with the gas, after the hot dip galvanization, have been heat treated at a temperature in the range from 400 to 750° C.

The invention further relates to the use of the heat exchanger.

6 Claims, No Drawings

HEAT EXCHANGER FOR HEATING GAS AND USE OF THE HEAT EXCHANGER

The invention proceeds from a heat exchanger for heating gas to a temperature in the range from 150 to 400° C., wherein the gas is heated by indirect heat transfer.

Heating gas to a temperature of more than 150° C. is required, for example, when the gas is being used as drying gas. Applications of this kind are, for example, driers in superabsorbent production. Two different processes are known for production of superabsorbents: firstly production in a mixing kneader, in which case the superabsorbent thus produced is dried in a belt drier in a next step, and secondly in a spray tower, in which the monomer solution is introduced by spraying in countercurrent to a drying gas, polymerized to superabsorbent particles while falling within the spray tower and simultaneously dried.

Especially in the case of use in superabsorbent production, standard heat exchangers have a tendency to corrosion. It is therefore necessary to protect the surfaces of the heat exchanger against corrosion. For this purpose, it is possible to manufacture the heat exchanger from stainless steel. However, this has the disadvantage that, because of the poorer thermal conductivity of stainless steel, a much larger heat exchanger is required. A further option would be production of the heat exchanger from aluminum. However, this has the disadvantage in superabsorbent production that superabsorbent particles can still be present in the gas, especially in the case of circulation of the gas, and the superabsorbent has an abrasive effect, especially with respect to aluminum, which is soft compared to steel. Alternatively, it is also possible to provide the surfaces which come into contact with the gas with a suitable coating. For this purpose, the surfaces can be provided, for example, with a zinc coating by hot dip galvanization.

At the temperatures of more than 200° C. that occur in the heat exchanger, the zinc coating, however, has a tendency to delaminate. This effect is also known as the Kirkendall effect. This can result in detachment of zinc particles and contamination of the superabsorbent. However, this leads to an unwanted reduction in quality of the superabsorbent.

It is therefore an object of the present invention to provide a heat exchanger which does not have the disadvantages known from the prior art.

The object is achieved by a heat exchanger for heating gas to a temperature in the range from 150 to 400° C., wherein the gas is heated by indirect heat transfer, wherein all the surfaces of the walls of the heat exchanger which come into contact with the gas have been hot dip galvanized and the surfaces which come into contact with the gas, after the hot dip galvanization, have been heat treated at a temperature in the range from 400 to 750° C.

It has been found that, surprisingly, as a result of the heat treatment which follows on from hot dip galvanization, the zinc coating remains stable and the Kirkendall effect does not occur even when the gas is heated to a temperature in the range from 150 to 400° C. and the coating remains undamaged. Especially when the heat exchanger is used in the production of superabsorbents, this prevents the superabsorbent particles from becoming contaminated by detachment of zinc layers.

For production of the galvanized surface, the components of the heat exchanger to be galvanized, after an appropriate pretreatment, are first dipped into a bath of molten zinc. In the course of this, zinc accumulates on the surface of the heat exchanger and bonds to the surface. In order to obtain a stable bond and to be able to conduct a hot dip galvanization, it is necessary that the material from which the heat exchanger is manufactured is stable to the hot dip galvanization temperatures. In addition, it is necessary that good heat transfer is possible, for which the material should have a very low coefficient of heat transfer. Suitable materials are therefore especially metals. In a particularly preferred embodiment, the walls of the heat exchanger are manufactured from sheet steel.

After the dipping and holding of the components of the heat exchanger to be galvanized in the bath of molten zinc, these components are removed from the zinc bath and cooled under air. This results in formation of a zinc-iron diffusion layer and of a pure zinc layer on the surface of the walls of the heat exchanger. The hot dip galvanization is conducted by the standard methods known to those skilled in the art.

After the cooling and solidification of the zinc coating produced by the hot dip galvanization, the heat exchanger, in accordance with the invention, is subjected to a heat treatment at a temperature in the range from 400 to 750° C., preferably in the range from 525 to 575° C., for example at a mean component temperature of 550° C. The duration of the heat treatment at a temperature of more than 525° C. is preferably in the range from 1 to 5 min, especially in the range from 2 to 3 min.

When the heat treatment is conducted at a temperature in the range from 400 to 450° C., the duration of the heat treatment is extended up to 90 min. At temperatures between 450° C. and 525° C., the required duration of the heat treatment should be adjusted correspondingly and decreases with increasing temperature.

In this context, the heat treatment can be conducted in any desired furnace known to those skilled in the art. Suitable furnaces are, for example, continuous furnaces.

The heat exchanger may have any desired design known to those skilled in the art for heat exchangers in which indirect heat transfer is effected. The gas can be heated in cocurrent, in countercurrent, in crosscurrent or in any desired combination thereof. Standard variants are, for example, cross-countercurrent or cross-cocurrent. Suitable heat exchangers are, for example, plate heat exchangers, shell and tube heat exchangers or spiral heat exchangers. Indirect heat transfer is understood to mean that heat is transferred from a hot fluid to a colder fluid, the hot fluid and the colder fluid being separated from one another by a wall. This results in heat transfer through the wall of the heat exchanger. For the heating of the gas to a temperature in the range from 150 to 400° C., the gas is the colder fluid. The hot fluid used is a suitable heat transfer medium having a temperature above the temperature to which the gas is to be heated. Suitable heat transfer media are, for example, superheated steam, a thermal oil suitable for the temperature, an ionic liquid or a salt melt. A preferred heat transfer medium is superheated steam.

In order to obtain good heat transfer, it is preferable when the surface area which comes into contact with the gas to be heated is at a maximum. For this purpose, it is possible, for example, to provide the walls which come into contact with the gas with fins. Because of the good heat conduction of the material from which the walls are manufactured, the fins mounted on the wall are also heated. It is necessary here for the bond of the fins to the wall to have good thermal conductivity. For this purpose, the fins are preferably soldered to the wall or welded to the wall. Adhesive bonding of the fins to the wall is generally less advantageous since standard polymer-based adhesives firstly do not withstand the temperatures and polymers secondly have poorer thermal conductivity than metals, such that the effect of the increased heat transfer area as a result of the fins is only very small in the case of adhesive bonding. Attachment of the fins by screws or rivets is not advantageous either, since it cannot be ensured in this case that the fins are fully aligned with the wall. If a gap is established between wall and fin, the gas to be heated will flow through it, the gas to be heated having much poorer thermal conductivity than metal, such that the fins in these regions cannot assume the surface temperature of the wall and so the effect resulting from the fins likewise does not occur. In the case of galvanization, even zinc does generally flow into a possible gap between fins and the wall, but it cannot be ensured thereby that the gap will be closed by the galvanization.

The invention further relates to the use of such a heat exchanger. Advantageously, the heat exchanger is used for drying superabsorbent particles.

Superabsorbents are materials that can absorb and store several times their mass of liquid. Typically, superabsorbents are polymers based on polyacrylate or polymethacrylate, also referred to as poly(meth)acrylate hereinafter. These are typically prepared from esters of acrylic acid or methacrylic acid and suitable crosslinkers known to those skilled in the art. The reactants used for preparation of the poly (meth)acrylates and the conversion thereof in a mixing kneader is described, for example, in WO 2006/034853 A1.

In one embodiment of the invention, the heat exchanger is used in a belt drier for drying superabsorbent particles. In this case, the superabsorbent is produced in a reactor, withdrawn from the reactor and then dried in a belt drier. The reactor used in this case is typically a mixing kneader. The reactants for production of the superabsorbent are added thereto. The reactants are converted to the superabsorbent in the mixing kneader, forming a high-viscosity mass. This mass is broken up with suitable kneading bars in the mixing kneader. The product formed is a coarse-grain material.

This coarse-grain material is added to the belt drier. For this purpose, the superabsorbent material is distributed on a drying belt of the belt drier, and a gas is passed over it at a temperature of preferably at least 50° C., more preferably at least 100° C., even more preferably at least 150° C., and preferably up to 250° C., more preferably up to 220° C., most preferably up to 200° C. The gas used may, for example, be air or gases that are inert towards the superabsorbent material, for example nitrogen. Preference is given, however, to the use of air as drying gas.

The drying gas is heated in the heat exchanger of the invention to the temperature required for the drying. The heat exchanger may be disposed within the belt drier, for example beneath the drying belt. Alternatively, it is also possible to position the heat exchanger outside the belt drier and feed the gas heated in the heat exchanger to the belt drier on one side, and to remove it again from the belt drier at another position and feed it back to the heat exchanger. In this case, the drying gas is conducted in a circuit. When the heat exchanger is disposed outside the belt drier, this has the advantage that a suitable particle separator can be positioned between the belt drier and heat exchanger, in order to remove entrained superabsorbent particles from the gas stream. Suitable particle separators are, for example, cyclones or filters.

When the heat exchanger is positioned beneath the drying belt, the heated drying gas ascends and thus flows around superabsorbent particles from below. In the course of this, the gas cools down and flows back downward again, such that a gas flow in the belt drier is established. This has the advantage over a heat exchanger positioned outside the drier that no large gas flows have to be circulated with the aid of a suitable blower and conducted through the heat exchanger, since natural convection is established. A disadvantage, however, is that it is impossible to separate superabsorbent particles from the gas which flows through the heat exchanger and is heated therein.

In both variants, however, it is necessary to remove a portion of the gas from the process, in order to remove the water absorbed in the course of drying. If all the gas is circulated, the water released in the course of drying accumulates in the gas and the water concentration becomes ever higher until effective drying is no longer possible.

Downstream of the belt drier, the superabsorbent particles are ground and fed to a postcrosslinking operation and a drying operation. Finally, the superabsorbent particles are classified by size, for which it is customary to use a sieving machine having several sieve decks. Superabsorbent particles that are too small are introduced back into the mixing kneader, such that they mix with the superabsorbent mass which forms and sufficiently large particles can thus be produced. Superabsorbent particles that are too large are recycled into the mill and subjected once again to the grinding operation in order to comminute them further.

In an alternative embodiment, the superabsorbent particles are produced in a spray tower. For this purpose, the reactants used for the production of the superabsorbents are first mixed and then dropletized in a spray tower, producing droplets having a size which is chosen such that the superabsorbent particles formed in the spray tower from the droplets by reaction of the reactants meet the desired specification.

In the spray tower, the droplets fall from the top downward, while a drying gas is fed in simultaneously. This drying gas has been heated to a temperature required for the production of the superabsorbent and the subsequent drying thereof. The drying gas can be added in cocurrent or in countercurrent. Typically, drying gas is fed in at the top of the spray tower above the addition point for the reactants. During the fall, the liquid reactants in the droplets are converted to the superabsorbent polymer. This gives rise to superabsorbent particles having a size corresponding essentially to the size of the droplets. The droplets fall into a fluidized bed in the lower region of the spray tower, in which drying gas is fed in from the bottom. Further polymerization is effected in the fluidized bed. Since drying gas is fed in both from the top and from the bottom, there is a gas withdrawal point above the fluidized bed, in which the drying gas is drawn off from the spray tower. Since superabsorbent particles entrained in the drying gas are present, the drying gas is freed of solids present therein. For this purpose, it is possible to use, for example, cyclones and/or filters.

The drying gas is typically circulated, it being necessary to remove a portion of the drying gas in order to keep the water content in the drying gas constant. Alternatively, it is also possible first to condense the moisture out of the drying gas and then to reheat the drying gas. However, this requires a lot of energy, and so this is viable only when a gas other than air, for example nitrogen, is being used as drying gas. When air is being used as drying gas, it is possible to remove a portion from the process as offgas and, at the same time, to replace the amount removed with fresh air.

Before the drying gas is fed to the spray tower, either at the top or in the fluidized bed, it has to be heated to the necessary temperature. For this purpose, the above-described heat exchanger is used. In order to avoid damage as a result of abrasion because of the superabsorbent particles entrained by the drying gas, the heat exchanger is preferably at a position in the drying gas circuit beyond the removal of the solids.

The heating of the drying gas for the belt drier or for the spray drier is effected by heat transfer from a heat transfer medium to the drying gas in the heat exchanger. Suitable heat transfer media are, for example, a thermal oil, an ionic liquid, a salt melt or steam. A particularly preferred heat transfer medium is steam, it being possible to use either saturated steam or superheated steam.

As well as use for heating the drying gas used in superabsorbent production, it is also possible to use the heat exchanger of the invention in any other processes in which a gas has to be heated to a temperature of more than 150° C., the gas comprising constituents that are corrosive or abrasive with respect to the materials typically used for heat exchangers, and coating with zinc providing a surface which is not attacked by the constituents present in the gas, such that, firstly, no impurities are introduced into the gas by the material removed from the heat exchanger and, secondly, corrosion of the heat exchanger is prevented and hence the lifetime of the heat exchanger is extended.

The invention claimed is:

1. A method of drying superabsorbent particles comprising heating a drying gas to a temperature in a range from 150 to 400° C. by indirect heat transfer in a heat exchanger for heating gas to a temperature in the range from 150 to 400° C. by indirect heat transfer, wherein all surfaces of walls of the heat exchanger which contact a gas have been hot dip galvanized and then cooled under air to form a zinc-iron diffusion layer and a pure zinc layer on the walls, wherein after the hot dip galvanization and cooling under air, surfaces which contact the gas have been heat treated at a temperature in the range from 400 to 750° C., thereby achieving a zinc coating that remains stable and wherein no Kirkendall effect occurs.

2. The method according to claim 1, wherein the heat exchanger is disposed beneath a drying belt of a belt drier.

3. The method according to claim 1 for drying superabsorbent particles.

4. The method according to claim 1, wherein the heat exchanger heats the drying gas which is added to a spray tower for production of superabsorbent particles.

5. The method according to claim 1, wherein the drying gas is circulated.

6. The method according to claim 1, wherein a thermal oil, an ionic liquid, a salt melt, or steam is used as a heat transfer medium.

* * * * *